United States Patent [19]

Ridings, Jr. et al.

[11] 4,066,844
[45] Jan. 3, 1978

[54] ADAPTABLE ZERO ORDER PREDICTOR FOR SPEECH PREDICTIVE ENCODING COMMUNICATIONS SYSTEMS

[75] Inventors: Robert Paul Ridings, Jr., Walkersville; Raymond Henry Lanier, Hyattsville, both of Md.

[73] Assignee: Communications Satellite Corporation, Washington, D.C.

[21] Appl. No.: 631,594

[22] Filed: Nov. 13, 1975

[51] Int. Cl.² .............................................. H04J 3/16
[52] U.S. Cl. .......................... 179/15 BW; 179/15 AS
[58] Field of Search ........ 179/15 BW, 15 AS, 15 BV, 179/15 BY, 15.55 R, 15 BA

[56] References Cited

U.S. PATENT DOCUMENTS

| | | | |
|---|---|---|---|
| 3,584,145 | 6/1971 | Cutler | 179/15 BW |
| 3,588,364 | 6/1971 | Wallingford | 179/15 BW |
| 3,689,698 | 9/1972 | Lerner | 179/15 BW |
| 3,711,650 | 1/1973 | Kuhn | 179/15 BW |
| 3,927,268 | 12/1975 | Sciucci | 179/15 BW |

*Primary Examiner*—David L. Stewart
*Attorney, Agent, or Firm*—Sughrue, Rothwell, Mion, Zinn and Macpeak

[57] ABSTRACT

Bit rate compression in a digital communications system is provided by transmitting voice information from $n$ telephone circuits over the capacity conventionally allocated for transmission of voice information from $n/2$ circuits without appreciable degradation in quality. Alternatively, a doubling of the number of voice circuits may be provided with transmission at the same bit rate required for conventional transmission of voice information. Each frame period, at the transmitter, all $n$ circuits are serviced and, utilizing an adaptive predictive encoding scheme, a maximum of only ⅜ $n$ unpredictable samples in the given frame are transmitted over the available channel capacity. A sample assignment word (SAW), which identifies the circuits corresponding to the unpredictable samples, is transmitted therewith. Upon reception of the transmitted frame comprising the SAW and the unpredictable samples, the receiver updates the stored samples which were transmitted during previous frames as unpredictable samples by substituting the received unpredictable samples for the stored samples in accordance with the channel routing information provided by the SAW, thereby enabling proper reconstruction of all samples in the given frame. Means are provided for effectively recirculating the servicing sequence of the $n$ circuits to optimize the adaptive predictive encoding scheme.

10 Claims, 13 Drawing Figures

INPUT UNIT

SPEC RECEIVER

ADAPTABLE ZERO ORDER PREDICTOR FOR SPEECH PREDICTIVE ENCODING COMMUNICATIONS SYSTEMS

BACKGROUND OF THE INVENTION

1. Field of the Invention

This invention relates to multi-channel communications systems and, more particularly, to a redundancy removal scheme using adaptive predictive encoding of speech in a ditigal, multi-channel communications system for the purpose of bit rate reduction with no appreciable degradation in voice equality.

2. Description of the Prior Art

In communications systems using long and expensive transmission facilities, such as submarine cables and satellite communications systems, terminal facilities which insure optimum utilization of the transmission channels are very important. A well-known analog system, the Time Assignment Speech Interpolation (TASI) system, achieves communications efficiency, i.e., bandwidth compression, by means of a transmission time savings. The TASI system takes advantage of the statistical fact that during a telephone conversation, a one-way telecommunications channel is active only on the average of about 50% of the time. The TASI system monitors each voice circuit for voice activity and, in response to the detection of voice, connects a talker to an available channel. In this manner, a number of talkers greater than the number of available channels may be serviced by sharing the channels on a talkspurt interpolated basis.

The quality of speech transmitted by TASI is affected by three main sources of degradation. First, degradation occurs due to interpolation. If the number of talkers simultaneously talking in one direction exceeds the number of available channels, a certain number of these talkers will be temporarily denied a channel. This condition is known as "freeze-out". The portion of speech not being transmitted by a talker who is temporarily "frozen-out" results in speech quality degradation. Second, degradation occurs due to the operation time of speech detectors, there being one speech detector for each voice circuit. Prior to connecting a voice circuit to an available channel, the voice detector must detect speech activity in the voice circuit. During the time required for the voice detector to actually detect voice, the talker's speech signals are lost causing further degradation of voice quality. Third, degradation is due to speech signals being lost during the time needed for switching and signalling functions to establish the proper connection between talker and listener once speech activity is detected by the voice detector.

There are many characteristics of the Speech Predictive Encoding Communication (SPEC) system which is the subject of U.S. Pat. No. 3,927,268, by Joseph A. Sciulli et al that represents improvements over prior art systems. These improvements, while mentioned here, will become more readily apparent from the detailed discussion which follows. First, the SPEC system achieves bandwidth reduction by accommodating the traffic of n telephone circuits in the capacity of $n/2$ telephone channels with no noticeable degradation in received voice quality. Secondly, the SPEC system, being an all digital system, makes decisions on each voice circuit at the basic sampling rate. For this reason, the transmission of data within the voice band, which is a difficult task for TASI-like systems, can be accommodated. Third, SPEC system employs a predictive encoding scheme which significantly reduces the average activity factor (defined as the number of voice samples transmitted/the total number of voice samples) over prior systems without any appreciable loss in voice quality. Fourth, whereas the effect of "freeze-out" in TASI-like systems manifests itself as a "chopping" or "clipping" of the voice signal which can result in the loss of an entire syllable, the effect of "overload" (i.e., freeze-out) in the SPEC system results only in an amplitude error (as opposed to a "clip") in the received voice signal. In an "overload" condition, the SPEC system does not really "freeze-out" samples from the voice circuits "frozen-out" since those circuits will have corresponding voice samples stored at the receiver whereby the receiver can reconstruct replicas of the "frozen-out" samples. Also, by means of a recirculation of the servicing sequence of n voice circuits, the subjective effect of "overload" is substantially reduced. Fifth, the SPEC system utilizes a parity check scheme on the SAW for preventing misrouting of the transmitted voice samples at the receiver thereby reducing the effect of errors (resulting in small amplitude error) caused by channel noise. Sixth, the SPEC system is built in a modular configuration (i.e., 64 circuits serviced by 32 circuits) to permit easy expansion to large capacities. Seventh, the flexibility of the SPEC system allows transmission in either time division multiplex-frequency division multiple access (TDM-FDMA) or time division multiplex-time division multiple access (TDM-TDMA) systems. Eighth, the SPEC system can be used in a point to multipoint fashion in satellite communications. Any station can transmit voice information to several other stations while each of the other stations would use a receiver which only uses the specific voice circuits addressed to it. In this manner, larger amounts of telephone traffic destined for multiple stations can be interpolated at the transmitter of a single station. Finally, the implementation of the SPEC system will result in a lower cost per circuit as well as higher quality service than prior art systems such as TASI.

In accordance with the SPEC system, a bit rate compression in a digital, multi-channel, voice communication system is accomplished while maintaining normal voice transmission quality. The system is designed to transmit all information from n telephone circuits over the transmission capacity conventionally allocated for digital transmission of all voice information from $n/2$ circuits. All n voice circuits are sampled at a rate, known as the frame rate, of one voice circuit every 125 $\mu$ seconds. Each voice sample in a frame period is compared at the transmitter with the corresponding voice sample of a previous frame stored in a predictive frame memory (PFM). If the comparison indicates that the present sample is predictable from the corresponding previous sample, a logic "0" is generated indicating that the present sample need not be transmitted. If the comparison indicates that the present sample is unpredictable from the corresponding previous sample, then a logic "1" is generated indicating that the unpredictable sample should be transmitted.

Transmission of the unpredictable sample is accomplished in the following manner. A frame of information equivalent in bit rate to that required for conventional digital transmission of all voice information from $n/2$ voice circuits comprises the essential information and is formed at the transmitter. Assuming $n = 64$, the transmission frame comprises twenty-four, 8-bit time slots $T_1$ through $T_{24}$ designated for transmission of unpredictable samples and eight, 8-bit time slots $T_{25}$ through $T_{32}$ occupied by a 64 bit sample assignment word (SAW). The SAW informs the receiver as to which of the 64 voice circuits the unpredictable samples $T_1$-$T_{24}$ belong.

As the comparisons are made at the transmitter, the first comparison, indicating an unpredictable sample, results in that sample being placed in time slot $T_1$. If that sample is from voice circuit 3, for example, then the SAW will have "0" in its first and second bit slots and a "1" in the third bit slot. If the next voice circuit indicative of unpredictability is, for example, voice circuit 6, then that unpredictable sample will be placed in time slot $T_2$, and the SAW will have "0" bits in bit slots 4 and 5 and a "1" in bit slot 6. This operation continues until 64 comparisons have been made and the unpredictable samples placed in the available time slots $T_1$-$T_{24}$.

The receiver already has stored therein 64 voice samples which were transmitted during previous frames as unpredictable samples. When the receiver receives the presently transmitted information including the sample assignment word, it then updates the corresponding 64 voice samples stored therein by substituting the unpredictable voice samples for the stored voice samples in accordance with the channel routing information provided by the SAW. The receiver is then in a position to properly reconstruct the present frame of all 64 voice samples.

The system is designed around the statistics of speech such that on the average, in a system of 64 voice circuits of information, only 24 voice circuits will be nonredundant. However, there will be times when there is nonredundance, i.e., unpredicatability, in more than 24 voice circuits thereby resulting in "frame overload" for those circuits which number above the 24 time slots available for transmission on that particular frame. The system alleviates "overload" in two ways. First, if an unpredictable sample is not transmitted because time slots $T_1$ through $T_{24}$ are filled, the receiver utilizes the corresponding previous sample stored at the receiver for reconstruction of the unpredictable sample which could not be transmitted. Though the corresponding previous sample is being reconstructed as the unpredictable sample, the fact is the corresponding previous sample stored at the receiver should be close in value to the unpredictable sample which could not be transmitted. Secondly, the subjective effects of "overload" are alleviated by effectively recirculating the servicing sequence. For example, during frame 1, the voice circuits are serviced at the transmitter in sequence from 1 to 64. During the next frame, the voice circuits are effectively serviced in sequence starting with voice circuit 2; voice circuit 1 being the 64th circuit to be serviced; and so on. This recirculation of the servicing sequence continues so that in a period of 64 frames, each circuit has had the opportunity to be serviced at each priority level (i.e., first to 64th). In this manner, if the system is operating under "overload" conditions, the higher numbered circuits are not always serviced last since effectively those circuits become the lower numbered circuits on successive frames.

In the absence of channel errors, there are two variables which affect the total distortion produced by the SPEC system. The first variable is the predictor aperture. As the aperture is increased, the minimum amplitude difference required for predictability increases thereby reducing the ensemble average speech activity. An aperture increase also causes an increase in quantization noise because of the reduced resolution of the reconstructed sample.

The second variable in the system is frame overload which is directly proportional to the instantaneous value of ensemble speech activity. This causes a distortion called overload noise.

SUMMARY OF THE INVENTION

It is therefore an object of the present invention to adapt the predictor aperture to the instantaneous speech activity of each frame by choosing the smallest aperture which prevents frame overload.

Another object of the invention is an improvement in the SPEC system wherein the predictor aperture is adaptively adjusted to the smallest value such that frame overload is avoided.

According to the present invention, the foregoing and other objects are attained by providing a comparator for comparing the differences between the new samples from each of the 64 circuits and the previously transmitted samples, with a plurality, for example 16, of aperture threshold values. These values, while individually fixed, may form a linear progression or a non-linear progression, e.g., logarithmic or pseudo-logarithmic. The results of these comparisons are written into the corresponding location of a 84 × 16 memory. For example, if the difference $\delta$ of sample $n$ is $\delta > j$, $0 \leq J \leq 15$, a logic "1" is written into location $(n,j)$ of the 64 × 16 memory. At the same time, sixteen counters count the number of logic "1's" written into each of the sixteen rows of the 64 × 16 memory. When all 64 new samples have been compared with corresponding previously transmitted samples, the content of the sixteen counters are compared to the maximum number 24 of samples than can be transmitted in a single frame. A priority encoder then selects the smallest aperture value which results in the transmission of 24 or less unpredictable samples.

While the primary object of the present invention is to prevent frame overload in the SPEC system, the recirculating servicing sequence scheme of the basic SPEC system is preferably retained to optimize the operation of the invention. For example, if the count in the sixteenth aperture counter exceeds 24, then an overload condition exists in spite of the fact that this counter defines the smallest aperture of the predictor. This situation will occur rarely, if ever, depending on the initial selection of the sixteen aperture threshold values. A more common occurrence, however, is the situation where, for example, the eighth aperture counter has a count of 25 and the ninth aperture counter has a count of 20. Under the design constraints of the example given, the priority encoder would select the output of the ninth aperture counter as the aperture value for that given frame. But, in this example, the selection of the output of the ninth aperture counter means that four time slots in the frame will be vacant, resulting in a slight degradation in the efficiency of the system. By employing the recirculation servicing sequence in combination with the present invention, the output of the ninth aperture counter would be selected as the aperture value and the time slots remaining would be filled with unpredictable samples from the eighth aperture counter using the recirculation servicing sequence.

The invention, however, can be used with resulting improvement in the operation of the SPEC system without the recirculating servicing sequence. In this case, a simplification in the SPEC system is achieved with some degradation in efficiency. Even so, overload noise is effectively eliminated.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENT

Figure 1:
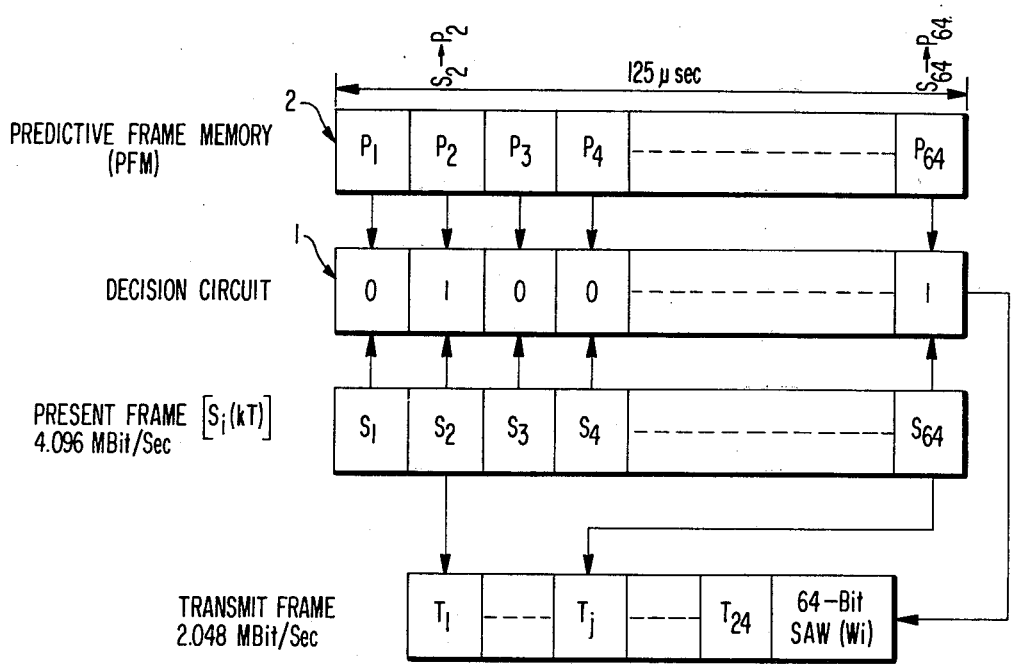
FIG. 1 is a diagram showing functionally the manner in which bit rate compression is achieved in a digital, multi-channel communications system using a redundancy removal scheme.

Referring to FIG. 1, there is shown functionally the manner in which bit rate compression is achieved in a digital, multi-channel communications system using redundancy removal techniques according to the SPEC system described in application Ser. No. 336,589. During one frame, n voice circuits are sampled and each sample $S_i(kT)$, a present sample, is fed to a decision circuit 1 shared by all the voice circuits. In decision circuit 1, the present sample $\hat{S}_i(kT)$ is compared with $\hat{S}_i(kT)$. $S(kT)$ is set to equal $P_i$ which is the corresponding previous sample stored in predictive frame memory (PFM) 2. Upon comparison, if the difference between the present sample $S_i(kT)$ and the predictive value $\hat{S}_i(kT)$ is greater than a predetermined threshold $\tau$, it is an indication that the present sample $S_i(kT)$ cannot be adequately predicted from the corresponding value $\hat{S}_i(kT)$. Therefore, the present sample $S_i(kT)$ must be ransmitted. The decision circuit 1 transfers the unpredictable, present sample $S_i(kT)$ to the ith location in the predictive frame memory 2 wherein $S_i(kT)$ replaces $P_i$. If the difference between $S_i(kT)$ and $\hat{S}_i(kT)$ is less than or equal to the predetermined threshold $\tau$, then $S_i(kT)$ need not be transmitted and the value $\hat{S}_i(kT) = P_i$ remains in PFM 2. The decision circuit 1 also generated a logic "1" for every unpredictable sample $S_i(kT)$ and a logic "0" for every predictable sample $S_i(kT)$. The series of "1's" and "0's" comprises the sample assignment word (SAW) which is part of the frame of information to be transmitted. Each time a "1" is generated, the associated unpredictable, present sample $S_i(kT)$ is placed in an available time slot $T_j$ of the transmission frame. The prediction rules are summarized as shown in FIG. 1.

After all $n$ voice circuits are processed, a frame of information comprising the unpredictable present samples and the SAW which identifies the voice circuits associated with the unpredictable present samples is transmitted. At the receiver, as will be further described, the transmitted information is used to update a predictive frame memory (PFM) which provides a sample every 125 $\mu$ seconds to reconstruct speech in each of the n voice circuits.

In the preferred embodiment of the SPEC system, it is possible to transmit n active voice circuits over $n/2$ channels. Assuming $n = 64$ wherein speech on each voice circuit is quantized into 8 bits, the normal bit rate would be equal to $64 \times 8 \times 8$ khz (the Nyquist sampling rate) $= 4096$ K bits/sec. The SPEC system, however, utilizes only 24 time slots $T_1$-$T_{24}$ (8 bits each) of voice information plus eight time slots $T_{25}$-$T_{32}$ (8 bits each) for the SAW. The bit rate is then ½ of the normal rate or $(24 + 8$ times slots$) \times (8$ bits/time slot$) \times 8$ khz $= 2048$ $k$ bits/sec. The 2:1 compression ratio is achieved by applying to each of the $n$ channels the predictive encoding algorithm called a zero-order predictor, well known in the art, and described above. It will be understood by those skilled in the art that this 2:1 compression ratio is achieved on the output of the voice detector which itself achieves an even greater compression.

Although the efficiency of this system relies upon the redundant qualities of speech, all of the trunks serviced by the present invention need not be voice circuits. The SPEC system would be operative to provide efficient use of transmission capacity where a small percentage of known input trunks contain data. The transmission of data would be based on standard techniques known to those skilled in the art.

Figure 6:
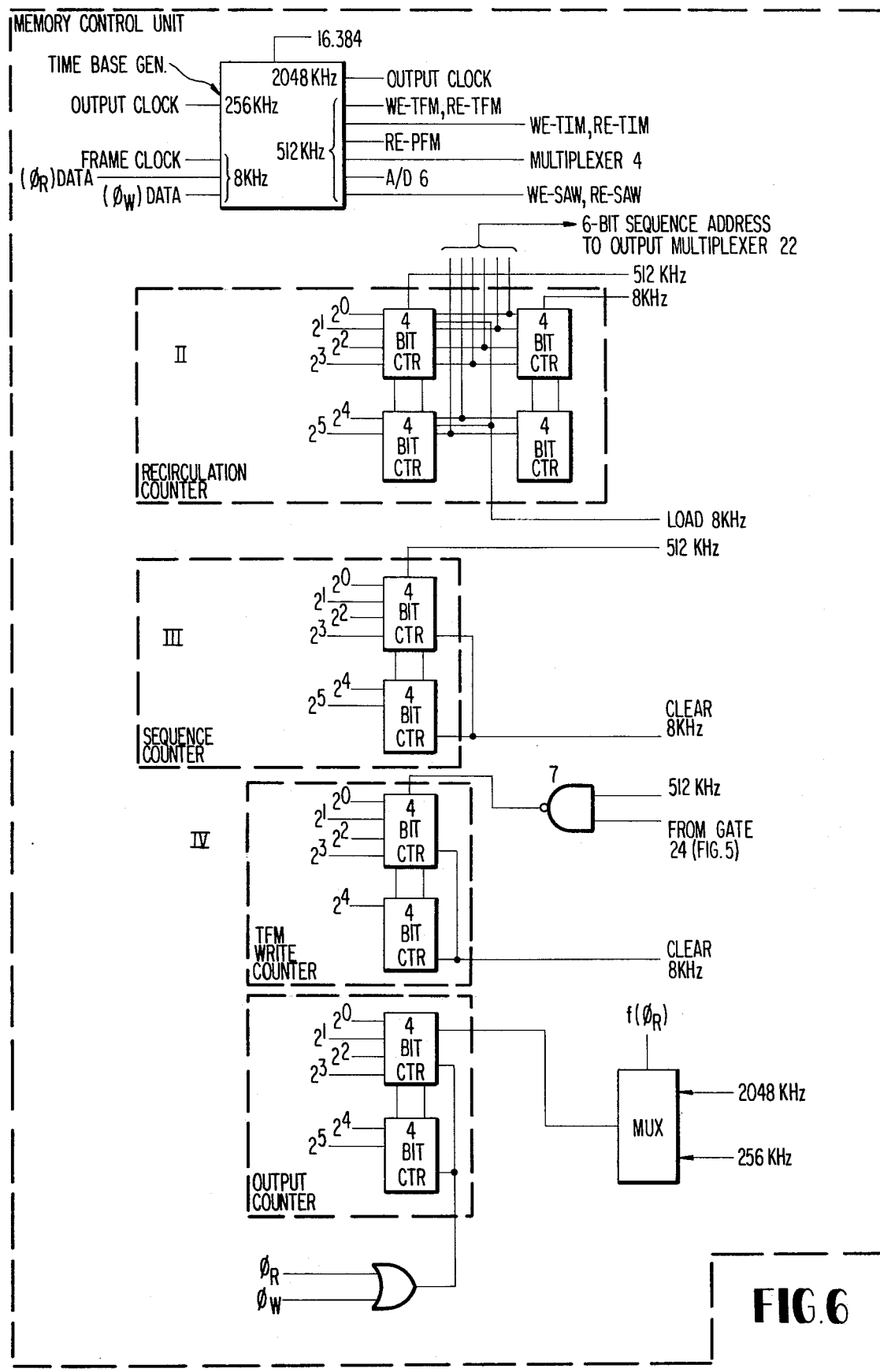
FIG. 6 is a schematic diagram of a memory control unit of the transmitter which provides the necessary timing and addressing functions for the transmitter.
Figure 10:
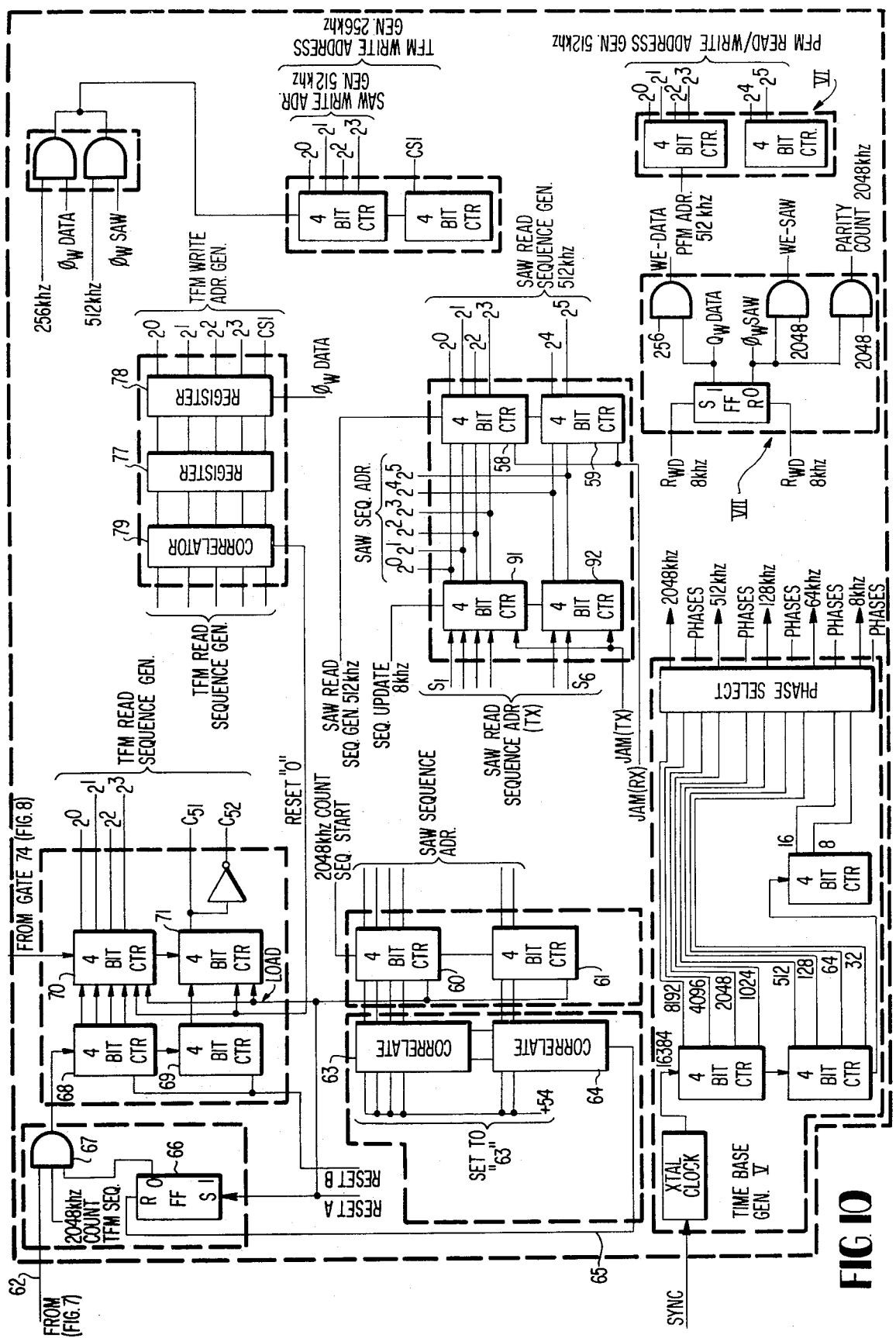
FIG. 10 is a schematic diagram of the memory control unit of the receiver which provides the necessary timing and addressing functions for all units of the receiver.

In continuing with a discussion of the SPEC system, reference will be made to FIGS. 6 and 10 of the drawings while discussing in detail other figures of the drawings. FIG. 6 shows the memory control unit for the transmitter which provides the basic timing and addressing information. For example, there is shown in FIG. 6 a time base generator I which generates the necessary timing functions of the transmitter units. The abbreviations shown in the time base generator I and other units of the memory control unit will become apparent from the further discussion of the invention. For example, WE-TFM refers to write enable-transmit frame memory; RE-PFM refers to read enable-predictive frame memory. Also shown are groups II, III and IV of 4-bit counters which provide necessary addressing information for the transmitter units. For example, IV provides adressing information for the TFM (transmit frame memory) of the transmitter while III is the sequence generator. The individual units at the transmitter serviced by the several units of the memory control unit are appropriately referenced as to addressing information received and clocking periods of the addresses. The detail shown in FIG. 6 is given to enable one of ordinary skill in the art to more readily understand the timing and addressing functions required for the SPEC system, although it is to be understood that even without such detail, one of ordinary skill would comprehend such timing and addressing functions upon reading the description of the preferred embodiment. The above is also true with respect to the memory control unit (FIG. 10) of the receiver. For example, the memory control unit has a time base generator V synchronized with time base generator I of FIG. 6 and a predictive frame memory (PFM) address generator VI which addresses the predictive frame memory of the receiver.

Figure 2:
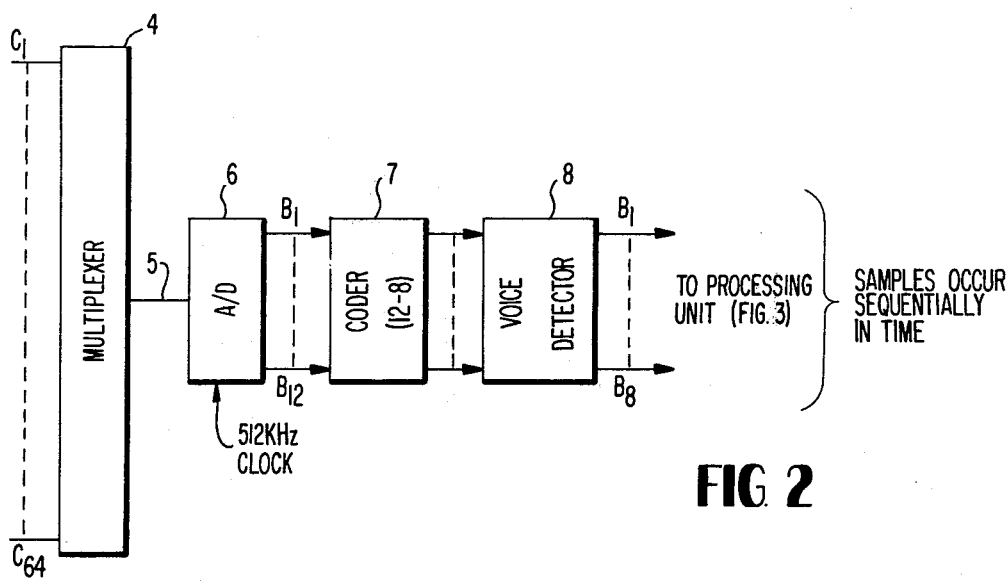
FIG. 2 is a block diagram of part of the equipment used at the transmitter.

Referring to FIG. 2, there is shown a block diagram of part of the apparatus of the SPEC system used at the transmitter. A multiplexer 4, known in the art, receives analog voice information on 64 parallel voice circuits $C_1$-$C_{64}$ and multiplexes the information in a time series for transmission over line 5 to analog/digital converter 6. Analog/digital converter 6, which is a linear encoder, encodes the analog signal from each voice circuit $C_1$-$C_{64}$ into a digital code word $S_i(kT)$ (present sample) comprising 12 parallel bits $B_1$-$B_{12}$ at the clock rate of 64 × 8 khz = 512 khz. Each 12-bit digital code word $S_i(kT)$ is then fed to a 12/8 Digitally Linearizable Code 7, known in the art, which compresses the 12-bit code word to an 8-bit code word. The conversion of the analog signal into a 12-bit digital code word by a linear encoder 6 companded to an 8-bit digital code word by coder 7 is required, as is well known, to obtain a desired companding characteristic. The 8-bit digital code word is then fed to a digital voice detector 8 which is used to minimize the unnecessary transmission of noise. Digital voice detector 8 may be of the type described in U.S. Pat. No. 3,712,959, entitled "Method and Apparatus for Detecting Speech In the Presence of Noise", by Ettore Fariello. Actually, since the signals from the voice circuits are time division multiplexed, the voice detector of the referenced patent would be adapted for use in the present invention to have common voice detection circuitry for circuits $C_1$-$C_{64}$; however, there would be individual hangover time storage for each such voice circuit.

Figure 3:
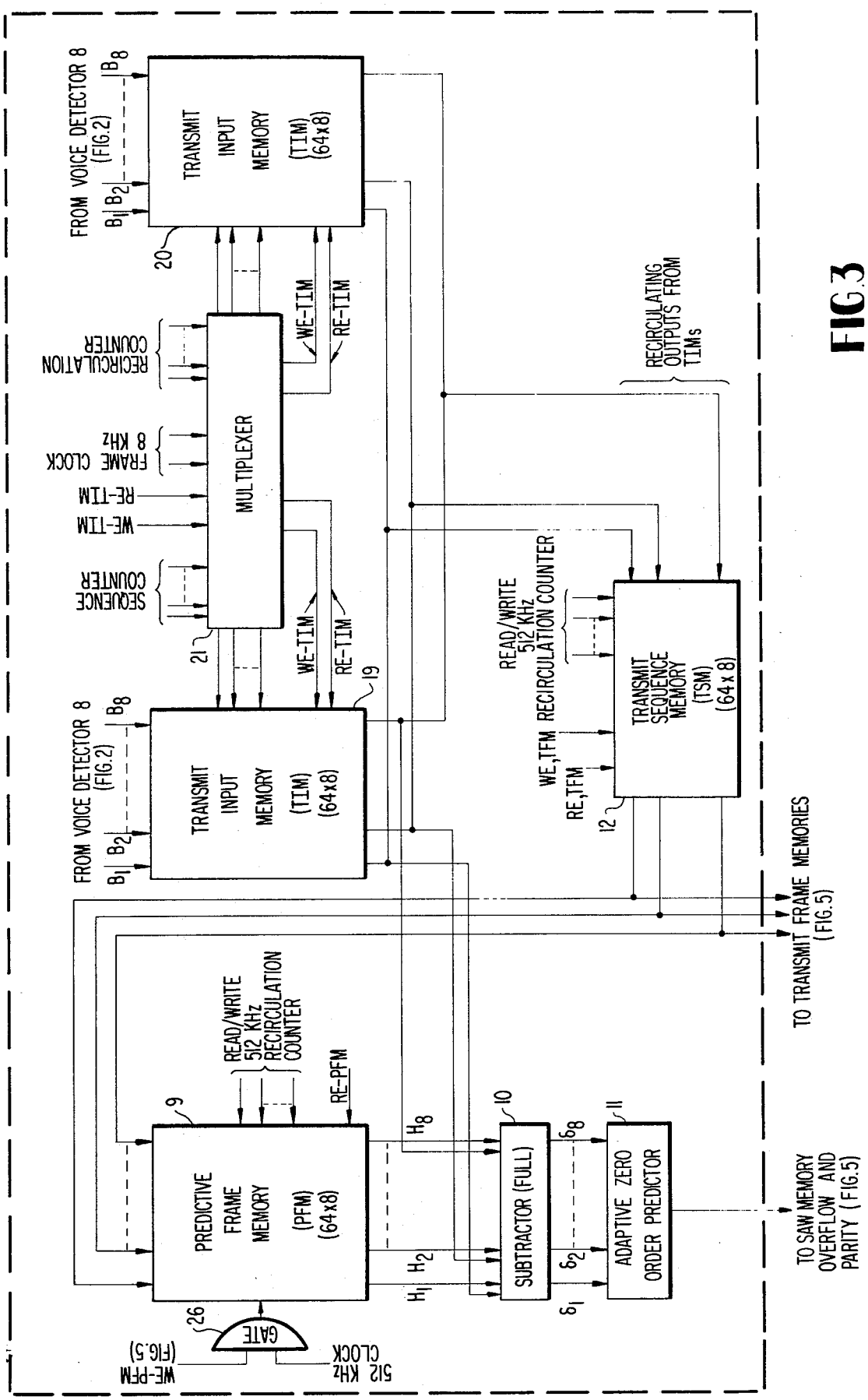
FIG. 3 is a schematic diagram of a processing unit for processing the digital signals at the transmitter.

Referring to FIG. 3, the 8-bit $B_1$-$B_8$ digital code word $S_i(kT)$ for each voice circuit $C_1$-$C_{64}$ is then written into one of two transmit input memories (TIM) 19 or 20. Each TIM 19 or 20 is a storage memory having a capacity of 64 rows by 8-bit/ row and is enabled to write-in the present samples during alternate frame periods (while the other memory is reading-out samples of the previous frame) via multiplexer 21 by the 8 khz frame clock. Multiplexer 21 is merely a set of switches or gates which transfer the timing and address signals to the proper TIM 19 or 20, as would be well known. There is therefore stored in TIM 19 or 20 all present samples $S_i(kT)$ from voice circuits $C_1$-$C_{64}$. Write-in of the present samples is accomplished sequentially from 1 to 64 under the control of a sequence counter (FIG. 6), whereas read-out of previously stored samples is accomplished in a recirculating manner from $i$ to $i$-1 (where $i$ is 1 to 64) under the control of a recirculation counter (FIG. 6).

The recirculating outputs from TIM 19 or 20 are written into a transmit sequence memory (TSM) 12 which is also a storage register having a capacity of 64 rows by 8 bits/row. TSM 12 is addressed for both write-in and readout by the recirculation counter and acts as a buffer storage to provide a delay of one frame period. The delayed recirculating digital code words from TSM 12 is fed to the transmit frame memories (TFM) 16 or 17 (shown in FIG. 5) to a predictive frame memory (PFM) 9. Predictive frame memory 9 is a storage register having a capacity of 64 rows (one for each voice circuit $C_1$-$C_{64}$) with 8 bits/row. The output from TIM 19 or 20 and the output from PFM 9 are fed to full subtractor 10. Full subtractor 10 digitally subtracts, in a manner well known in the art, the digital code word of the present sample $S_i(kT)$ of the ith voice circuit from the digital code word representing the corresponding prediction $\hat{S}_i(kT) = P_i$ (the corresponding previous sample) comprising 8-bits $H_1$-$H_8$ stored in PFM 9. The corresponding prediction $\hat{S}_i(kT)$ is read out of PFM 9 by the 512 khz Read/Write recirculation counter (shown in FIG. 6) synchronized with the time at which the corresponding present sample $S_i(kT)$ from TIM 19 or 20 is fed to the full subtractor 10. The 512 Khz Read/Write recirculation counter generates a 6-bit digital code word which defines any one of the 64 rows in PFM 9. The output of full subtractor 10 is a digital code word $\delta$ comprising 8-bits $\delta_1$-$\delta_8$ which represents the difference in magnitude between the present sample $S_i(kT)$ and the corresponding prediction value $\hat{S}_i(kT)$. This digital code word (i.e., "difference" code word) is then fed to an adaptive zero order predictor 11, shown in more detail in FIGS. 3A and 3B. As will be explained more fully hereinafter, the output of zero order predictor is used to generate a write enable (WE-PFM) pulse (a logic "1" or a logic "0") which is fed to PFM 9 via gate 26. The logic "1" enables PFM memory 9 to substitute the present sample $S_i(kT)$ for $P_i$ (contents of PFM 9) in the correct row defined by the 6-bit code word of 512 khz Read/Write recirculation counter. The logic "0" means that the present sample $S_i(kT)$, being predictable under the adaptive predictive encoding algorithm, is not substituted in PFM 9 for $P_i$.

Figure 3A:
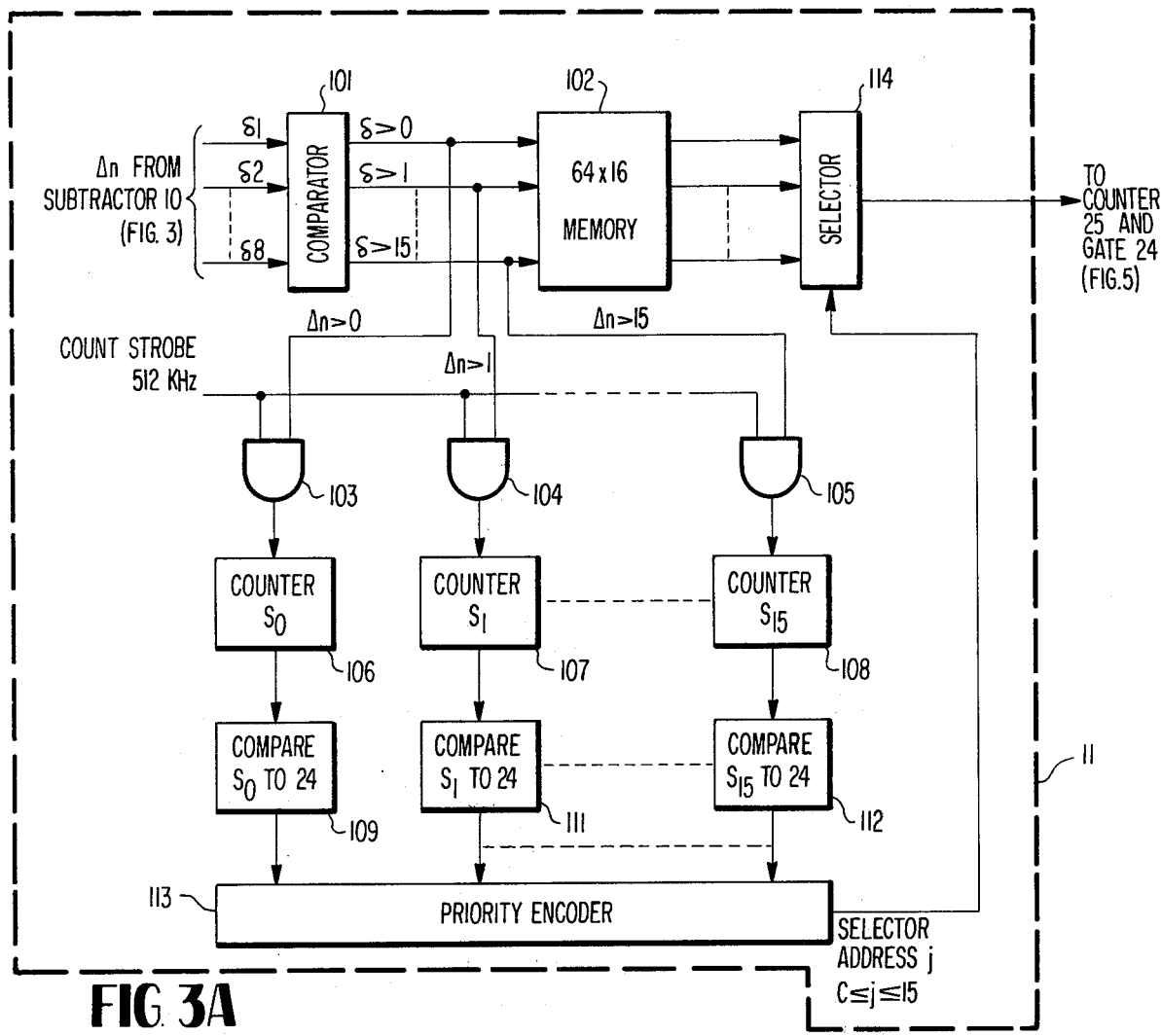
FIG. 3A is a detailed schematic diagram of the adaptable predictor according to the invention and used in the processing unit of FIG. 3.

FIG. 3A is a detailed schematic diagram of the adaptable threshold detector 11 which implements the adaptive aperture system of the invention. The digital code word $\delta$ comprising 8-bits $\delta_1$-$\delta_8$ from subtractor 10 is connected to comparator 101. In a well known manner, comparator 101 compares the code word $\delta$ with a plurality of aperture thresholds, indicated here simply as 0 to 15, inclusive. The actual values of these aperture thresholds may be arbitrarily chosen depending on system application and, while fixed in value, the aperture thresholds may follow either a linear or non-linear progression of increasing alue. In a preferred embodiment, the aperture thresholds follow a pseudo-logarithmic progression which has the effect of enhancing the companding characteristics of the SPEC system. Whatever the values of the aperture thresholds, the code word $\delta$ is compared to each of the sixteen different threshold values. If $\delta > j$, $0 \leq j \leq 15$, logic "1's" are written into locations $(n,0)$, $(n,1) \ldots (n,j)$ of a 64 × 16 memory 102. Logic "0's" are also written into memory locations $(n, j + 1)$, $(n, j + 2) \ldots (n, 15)$.

The outputs of comparator 101 are also connected to one input of respective gates 103, 104 and 105, the other inputs of which are connected in common to a 512 khz count strobe from time generator I (FIG. 6). The outputs of gates 103, 104 and 105 are respectively connected to counters 109, 111 and 112 which count the total number of logic "1's" generated by corresponding outputs from comparator 101. Thus for $\delta > j$, each of counters $S_o$ through $S_j$ is incremented by 1, and the counts in counter $S_{j+1}$ through $S_{15}$ remain unchanged.

After the samples from each of the 64 input circuits have been processed, the counters 106, 107 and 108 each contain the total number of non-predictable samples relative to the sixteen different aperture thresholds, and the memory 102 contains the corresponding activity maps or SAW for each aperture threshold. The contents of counters 106, 107 and 108 are then compared to the maximum number 24 of samples that can be transmitted in a single frame by comparators 109, 111 and 112, respectively. A priority encoder 113 then selects the smallest aperture value which, in the simplest case, results in the transmission of 24 or less unpredictable samples. The output of priority encoder 113 controls a selector 114 to read out the appropriate SAW from memory 102.

Figure 3B:
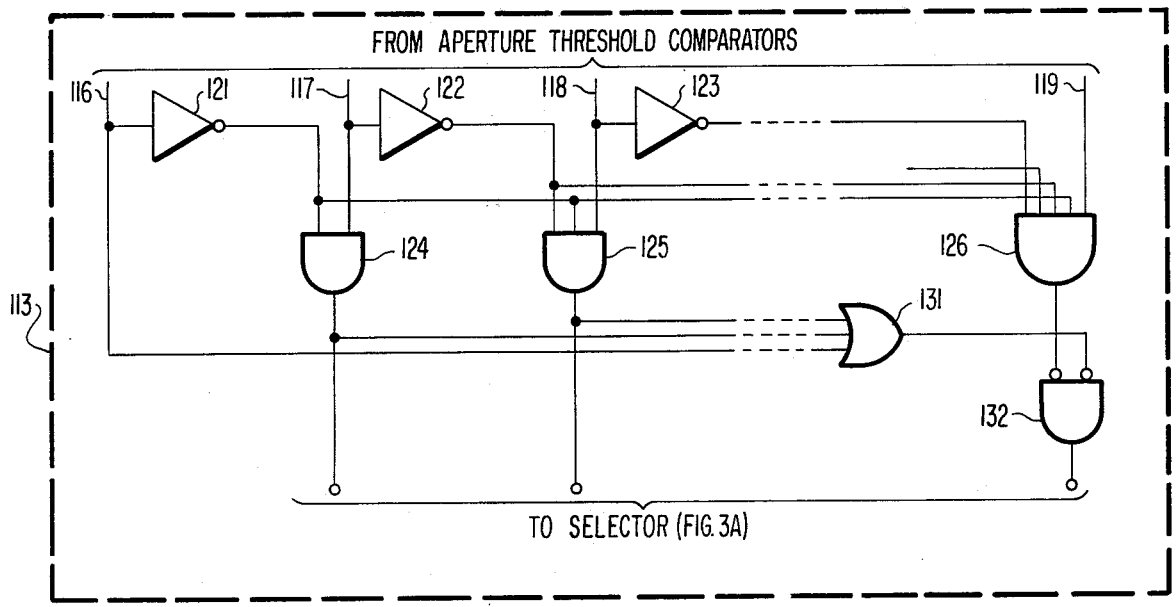
FIG. 3B is a logic diagram of one possible implementation of the priority encoder of the adaptable predictor.

The example of one possible implementation of the priority encoder 113 is shown in FIG. 3B. The inputs to the priority encoder are supplied over lines 116, 117, 118 and 119. In addition, the inputs on lines 116, 117 and 118 are inverted by inverters 121, 122 and 123, respectively. Lines 117, 118 and 119 are connected to one input of gates 124, 125 and 126, while the outputs of inverters connected to preceding input lines are connected as inputs to all succeeding gates. Thus, inverter 121 is connected to inputs of gates 124, 125 and 126, inverter 122 is connected to inputs of gates 125 and 126, and so forth. The result of this arrangement is that only one of line 116 or an output of a gate 124, 125 or 126 will have a logic "1" at any time. For example, if logic "0" is present on line 116, and logic "1's" are present on lines 117, 118 and 119, then the output of inverter 121 will enable gate 124, and the output of inverter 122 will inhibit gates 125 and 126 resulting in a logic "1" appearing only at the output of gate 124.

If it is only desired to select the smallest aperture value (and the corresponding SAW) which results in the transmission of 24 or less unpredictable samples, the structure thus far described for the priority encoder 113 is all that is required. However, in order to optimize the adaptable predictor, the aperture with ≦24 unpredictable samples are selected and the corresponding channels are transmitted with priority and additional unpredictable samples could be picked up from the next lowest aperture value under control of the recirculation counter as previously explained.

Figure 5:
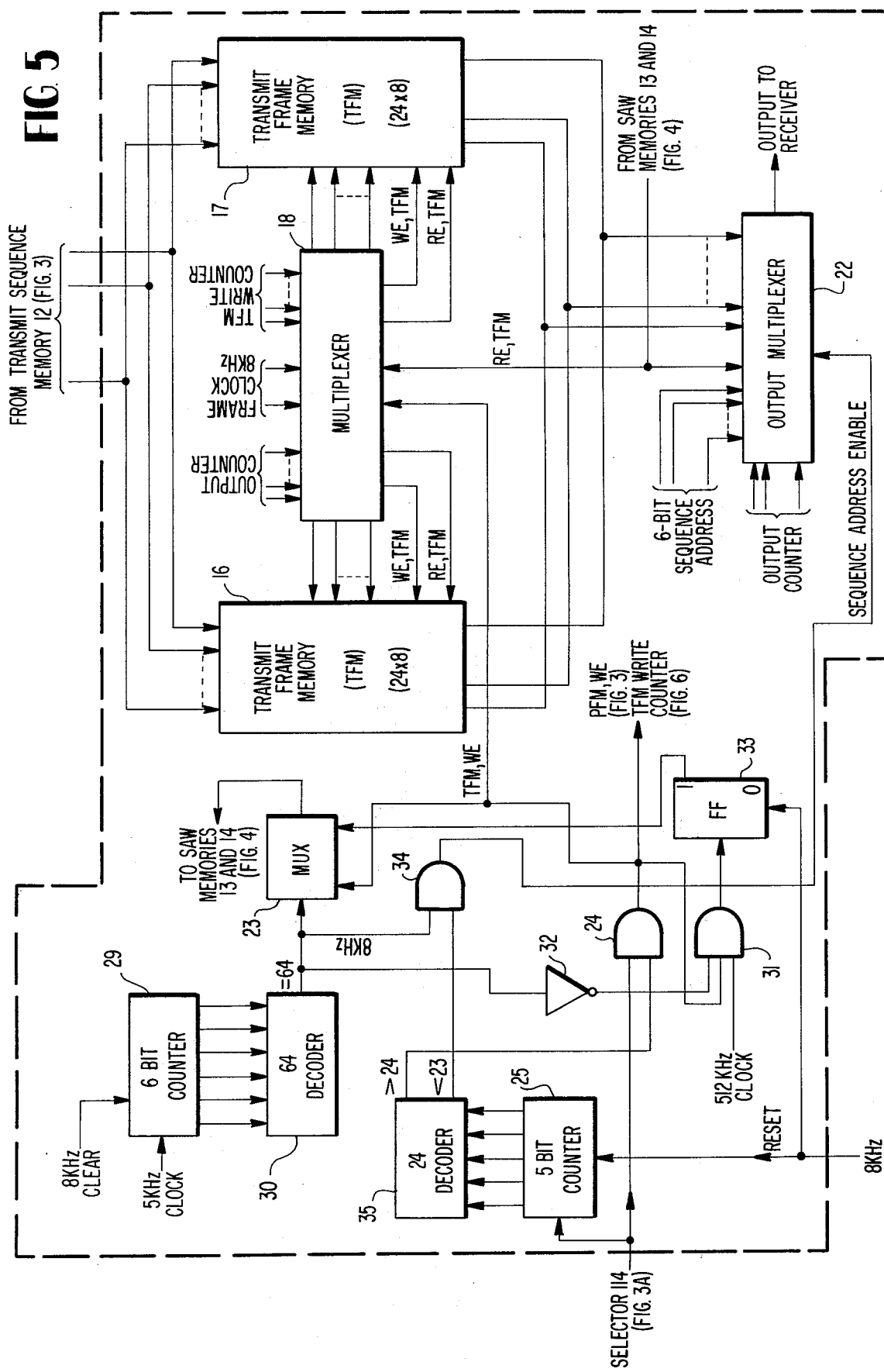
FIG. 5 is a schematic diagram of an output unit which develops the frame of information to be transmitted.

Referring to FIG. 5, after the 64 comparisons are made, one for each voice circuit samples, the 64 logic "1's" and "0's" which comprise the SAW selected by selector 114 are fed to AND gate 24 and 5-bit counter 25. Gate 24 is enabled to pass the first 24 logic "1's" of the SAW. A 6-bit counter 29 synchronized with the first bit of the SAW commences counting, and when the count of 63 is reached, a decoder 30 decodes the count 63 switching from a logic "0" to logic "1" thereby inhibiting gate 31 via inverter 32. The logic "1" from decoder 30 is also fed to multiplexer 23.

Gate 31 receives the output of AND gate 24 and the 512 khz clock and provides a triggering input to a symmetrically triggered flip-flop 33. The function of gate 31 and flip-flop 33 is to generate a parity bit as the 64th bit of the SAW. The parity bit is generated from the first 63 bits of the SAW and used by the receiver to check for the occurrence of an odd number of errors in the SAW being received. The reasons for a parity bit will be further discussed in relation to the receiver of the SPEC system. If it is predetermined that the SAW should always contain an even number of "1's", then the receiver will expect to receive a SAW having an even number of "1's". The parity bit (i.e., 64th bit of the SAW) would then be a logic "1" if the first 63 bits contain an odd number of "1" bits. This is accomplished by feeding the SAW via gates 24 and 31 to flip-flop 33 which changes state each time a logic "1" passes through. The output of gate 24 and the "true" output of flip-flop 33 are also fed to multiplexer 23. If, at the 64th bit flip-flop 33 is at "1", then a decision is made that the parity bit is set equal to logic "1". If flip-flop 33 is at "0", then the parity bit is set to logic "0".

As previously mentioned, counter 25 receives the SAW and counts the number of "1's" in it. Upon exceeding the count of 24, decoder 35 detects this condition and inhibits AND gate 24. Thus, only a maximum of 24 "1's" will be transmitted in the SAW. The output of gate 24 is connected to one input of gate 26 (FIG. 3) as the WE-PFM input. The output of gate 24 is also connected to the TFM write counter (FIG. 6) to be described in a later section of this disclosure.

Figure 4:
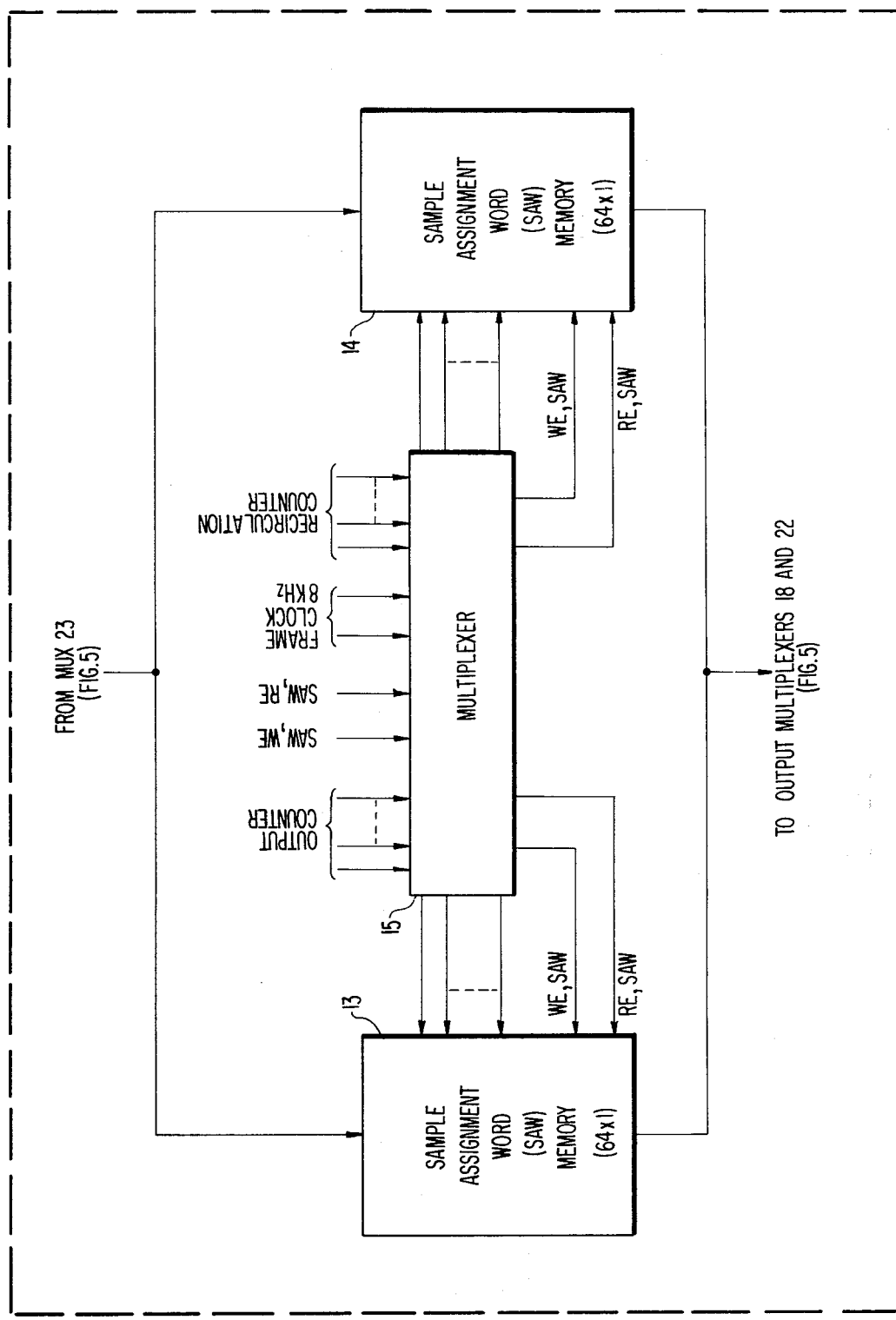
FIG. 4 is a schematic diagram of the sample assignment word (SAW) memory unit of the transmitter.

Referring now to FIG. 4, the output of multiplexer 23, which is the SAW with the parity bit, is fed in parallel into one of two SAW memory units 13 or 14. SAW memory units 13 and 14 are storage memories having a capacity of 64 rows × 1 bit/row.

The SAW memory units 13 or 14 are enabled on alternate frame periods via multiplexer 15, by the 8 khz frame clock and sequence counter (see FIG. 6) and by a write enable (WE-SAW) pulse, to write in the SAW associated with the present predictable and unpredictable voice samples for that frame. While one SAW memory, for example memory 13, is writing in the SAW of the present frame, the other is reading out the SAW of the previous frame.

While the present samples $S_i(kT)$ from voice circuits $C_1$-$C_{64}$ are being compared in full subtractor 10 with the contents $P_1$-$P_{64}$ of the PFM 9, the present unpredictable samples $S_1(kT)$-$S_{64}(kT)$ from TSM 12 (FIG. 3) are being written into one of the two transmit frame memories (TFM) 16 or 17 of FIG. 5. Each TFM 16 or 17 is a storage memory having a capacity of 24 rows by 8 bits/row and is enabled to write-in the present unpredictable samples during alternate-frame periods (while the other memory is reading-out samples from the previous frame) via a multiplexer 18 by the 8 khz frame clock and under the control of the WE-TFM taken from the output of gate 24.

The manner in which the information to be transmitted, comprising 24 time slots for voice information and 8 time slots for the SAW, is readied for transmission will now be described. In this discussion, it is assumed the 64 present samples $S_i(kT)$ have been compared and stored (actually while the present samples are being compared and stored it is the unpredictable samples of the previous frame which are being readied for transmission). Assuming the SAW associated with the 64 present samples has been written into SAW memory 13 (while this was happening SAW memory 14 was reading out the SAW corresponding to the previous frame), it is now ready to output its contents. The SAW is read from the SAW memory 13 under the control of the output counter (FIG. 6). For example, assuming during the third frame, the sequence, by which the SAW is read from SAW memory 13 under the control of the output counter starts with the bit corresponding to voice circuit $C_3$, the SAW memory 13 thereafter sequences in order through the other 63 bits (i.e., $C_4$, $C_5$, $C_6$, $C_{64}$, $C_1$, $C_2$). The SAW is fed to output multiplexer 22 (FIG. 5) which provides the output to the receiver.

As the 64 bits of the SAW are fed to the output multiplexer 22 of FIG. 5, the output of TSM 12 (FIG. 3) is written into TFM 16 or 17 under the control of the TFM write counter (FIG. 6) while the other TFM 17 or 16 is read out to multiplexer 22 under the control of the output counter (FIG. 6). TFM 16 or 17 is a storage memory having a capacity of 24 rows by 8 bits/row and is enabled to write-in the outputs of TSM 12 during alternate frame periods via multiplexer 18 by the 8 khz frame clock. The 6-bit sequence address from the recirculation counter (FIG. 6) defines the row in which the voice sample corresponding to the first bit read out of multiplexer 22 is situated. This sequence address is also fed to output multiplexer 22. Thus, the output multiplexer 22 generates an output code which comprises the 64-bit SAW and twenty-four 8-bit unpredictable samples. This code is transmitted to the receiver under the control of the output counter (FIG. 6). In our present example, the recirculation counter initially generates the 6-bit sequence address defining row 3 which corresponds to voice circuit $C_3$ and thereafter counts in sequence by code words defining voice circuits $C_4$, $C_5$, . . ., $C_{64}$, $C_1$, $C_2$. If the first five bits (from left to right) of the SAW are 00 | 0 | , then that indicates (remembering the first bit corresponds to voice circuit $C_3$) that voice circuits $C_3$ and $C_4$ are predictable. When the first "1" bit causes a write enable (WE) pulse from gate 24, the recirculation counter (FIG. 6) will be enabling row 5 in TSM 12 thereby resulting in the transfer of the sample in row 5 of TSM 12 to TFM 16 or 17. TFM 16 or 17 receives a 5-bit code word from TFM write counter (FIG. 6) defining a row commencing with row 1, in which to store the transferred samples and thereafter output them. This first unpredictable sample will then eventually be transmitted in time slot $T_1$ of the transmission frame. In a like manner, when the second "1" bit of the SAW enables the TFM 16 or 17, the sample in row 7 of the TSM 12 will be transferred to TFM 16 or 17 and eventually will appear in time slot $T_2$ of the transmission frame. In a like manner, all unpredictable present samples are transferred to TFM 16 or 17. While all unpredictable samples are loaded in TFM 16 or 17 and after the SAW from SAW memory 13 or 14 is fed to output multiplexer 22, the rows in TFM 17 or 16 are sequentially enabled by the output counter (FIG. 6) to output the samples on a row-by-row basis from the TFM 17 or 16 to output multiplexer 22.

Continuing with a discussion of the output unit of FIG. 5, assume that in a particular frame there are less then 24 voice circuits which are unpredictable. This may be accomplished by periodically gating priority encoder 113 (FIG. 3A) to select the smallest aperture value which results in the transmission of 24 or less unpredictable samples rather than the next largest aperture. This will result in a situation where more-or-less periodically, not all of the transmission time slots $T_1$-$T_{24}$ will be filled. Advantage is taken of the available time slots to transmit therein the 6-bit sequence code word which defines the particular servicing sequence orresponding to the frame number. In the present example, the 6-bit code word (plus two dummy bits to fill the 8-bit time slot) defining the sequence starting with voice circuit $C_3$ would be transmitted. The purpose of this, as will be hereinafter more fully explained, is to verify to the receiver the servicing sequence associated with the transmitted frame of information in case its recirculation generator becomes unsynchronized with the recirculation generator of the transmitter. Also, in place of the two dummy bits mentioned above, two parity check bits could be used to make a check at the receiver to determine if the sequence code word is being properly received. The parity check bit would be added as discussed previously with respect to the SAW parity check.

The manner in which the 6-bit sequence address is added to the transmission frame is as follows. The condition under which the decision to transmit the sequence code word is that counter 25 has not reached a count of 23 (indicating there are less than 24 logic "1's" in the SAW) whereas counter 29 has reached a count of 64 (indicating that the complete SAW has been counted). Under this condition, gate 34 is enabled and provides an output multiplexer 22. As a result, the 6-bit sequence address generated by the recirculation counter is forced into available time slots of the transmission frame. (Actually, two parity check bits are added to the sequence code word to provide an 8-bit word.) When counter 25 has reached a count of 24 prior to counter 29 reaching a count of 64, decoder 35 switches to logic "0" thereby disabling gate 34.

The servicing sequence is continuously being recirculated. That is, in the present example, the 6-bit recirculation counter started with a 6-bit sequence address defining voice circuit $C_3$ and thereafter generated, in sequence, 63 6-bit code words defining voice circuits $C_4$, $C_5$, . . . , $C_{64}$, $C_1$, $C_2$. During the next frame period, the recirculation counter is updated to start with a 6-bit sequence address defining voice circuit $C_4$ and thereafter generate 63 6-bit code words defining voice circuits $C_5$, $C_6$, . . . , $C_{64}$, $C_1$, $C_2$, $C_3$. As a result, the first bit read from multiplexer 22 is the bit corresponding to voice circuit $C_4$ followed, in sequence, by the bits corresponding to the other voice circuits. In this manner, recirculation of the voice circuits $C_1$-$C_{64}$ occurs such that each voice circuit $C_1$-$C_{64}$ effectively becomes the first voice circuit processed every 64 frames.

Figure 7:
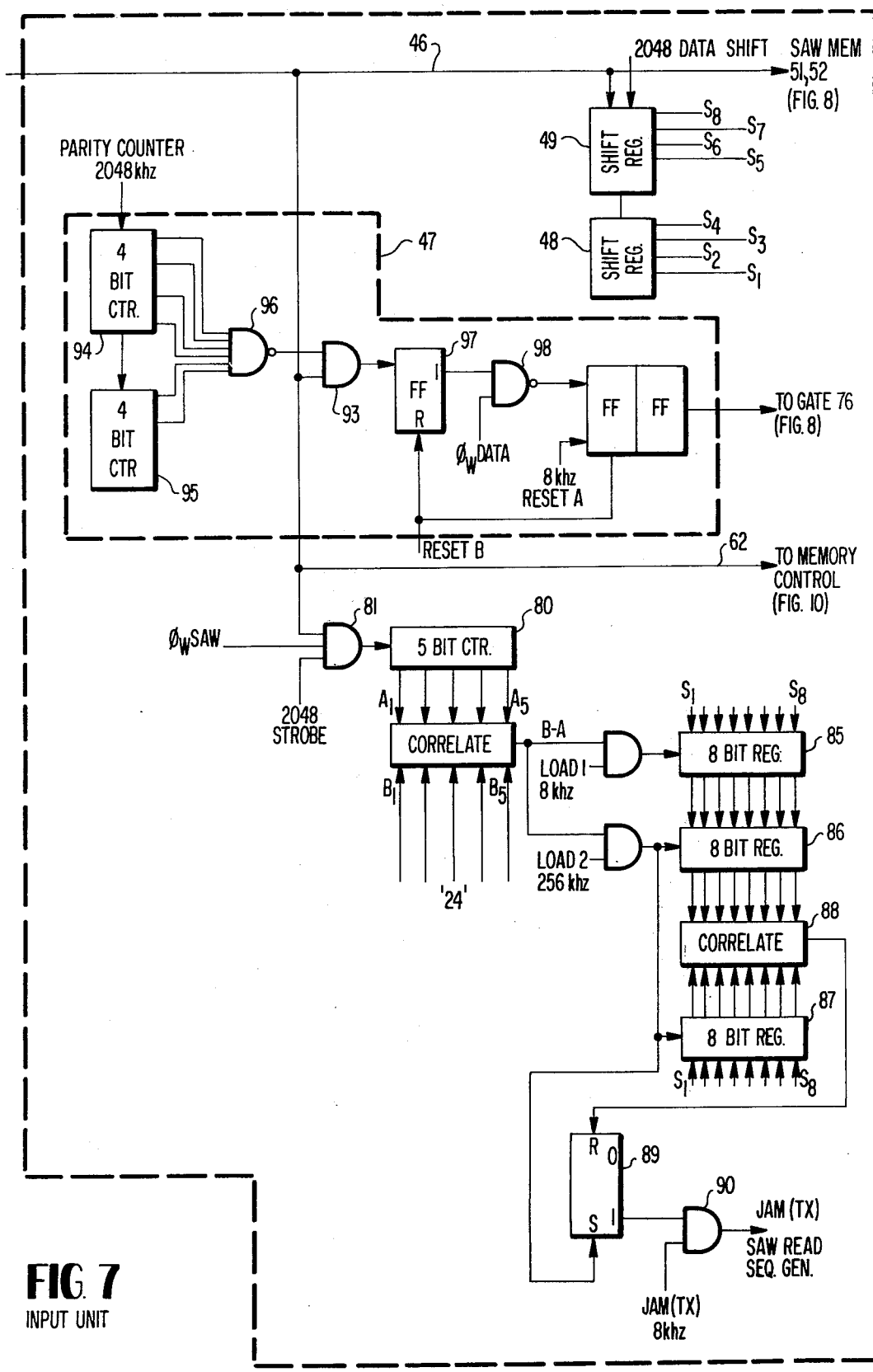
FIG. 7 is a schematic diagram of an input unit at the receiver which receives the frame of information transmitted.
Figure 8:
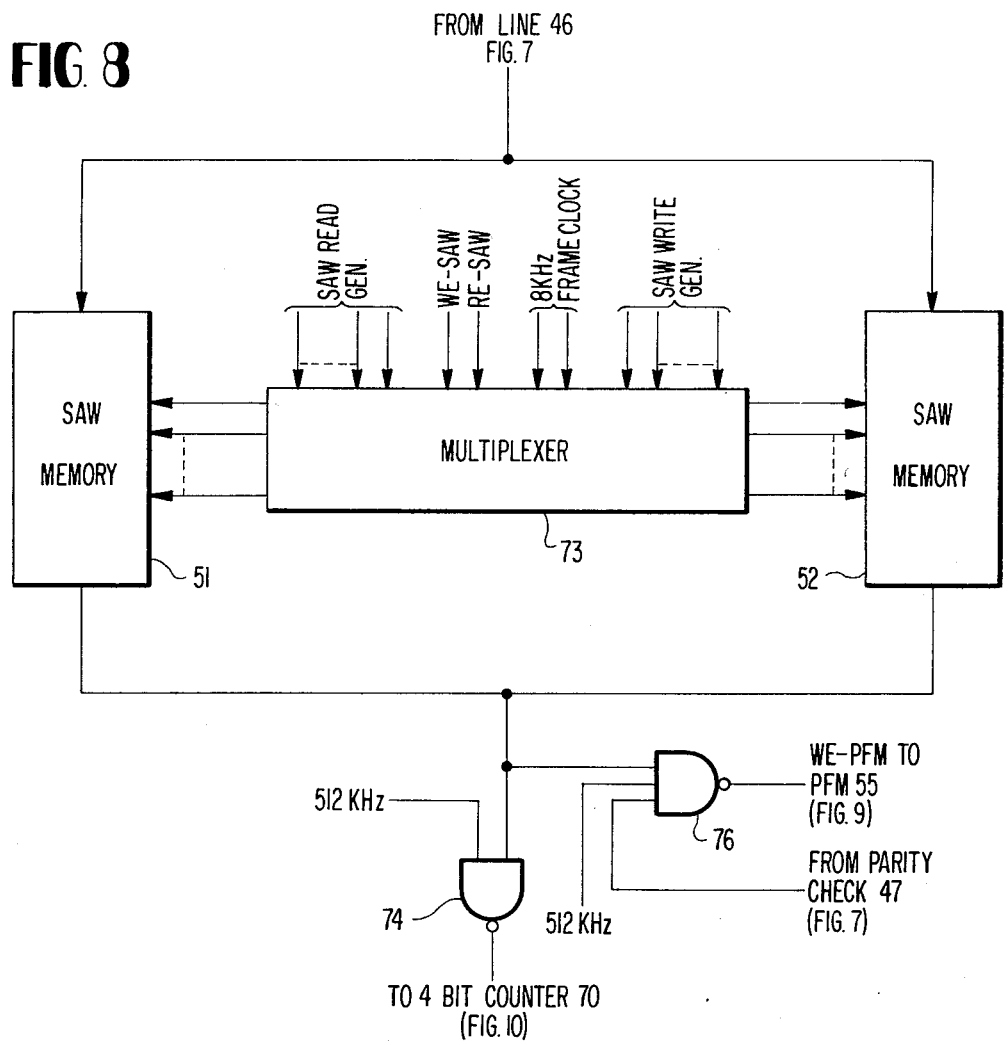
FIG. 8 is a schematic diagram of a sample assignment word (SAW) memory unit of the receiver.
Figure 11:
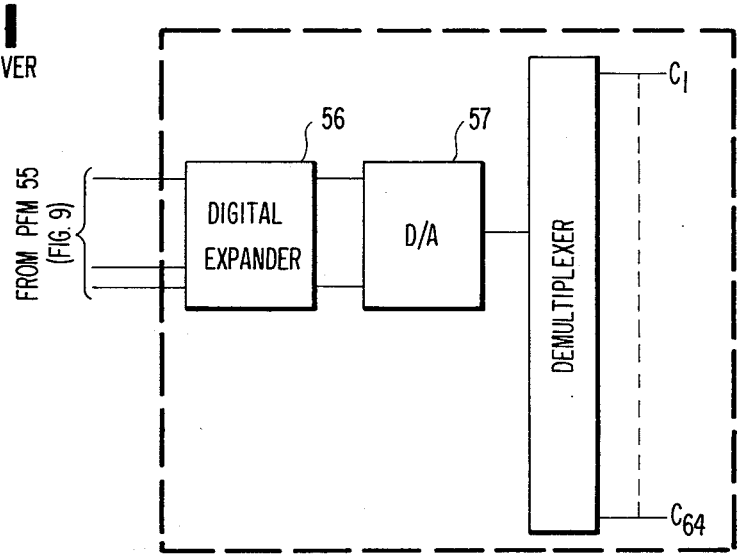
FIG. 11 is a block diagram of equipment used for the digital-to-analog conversion of the received signals.
Figure 9:
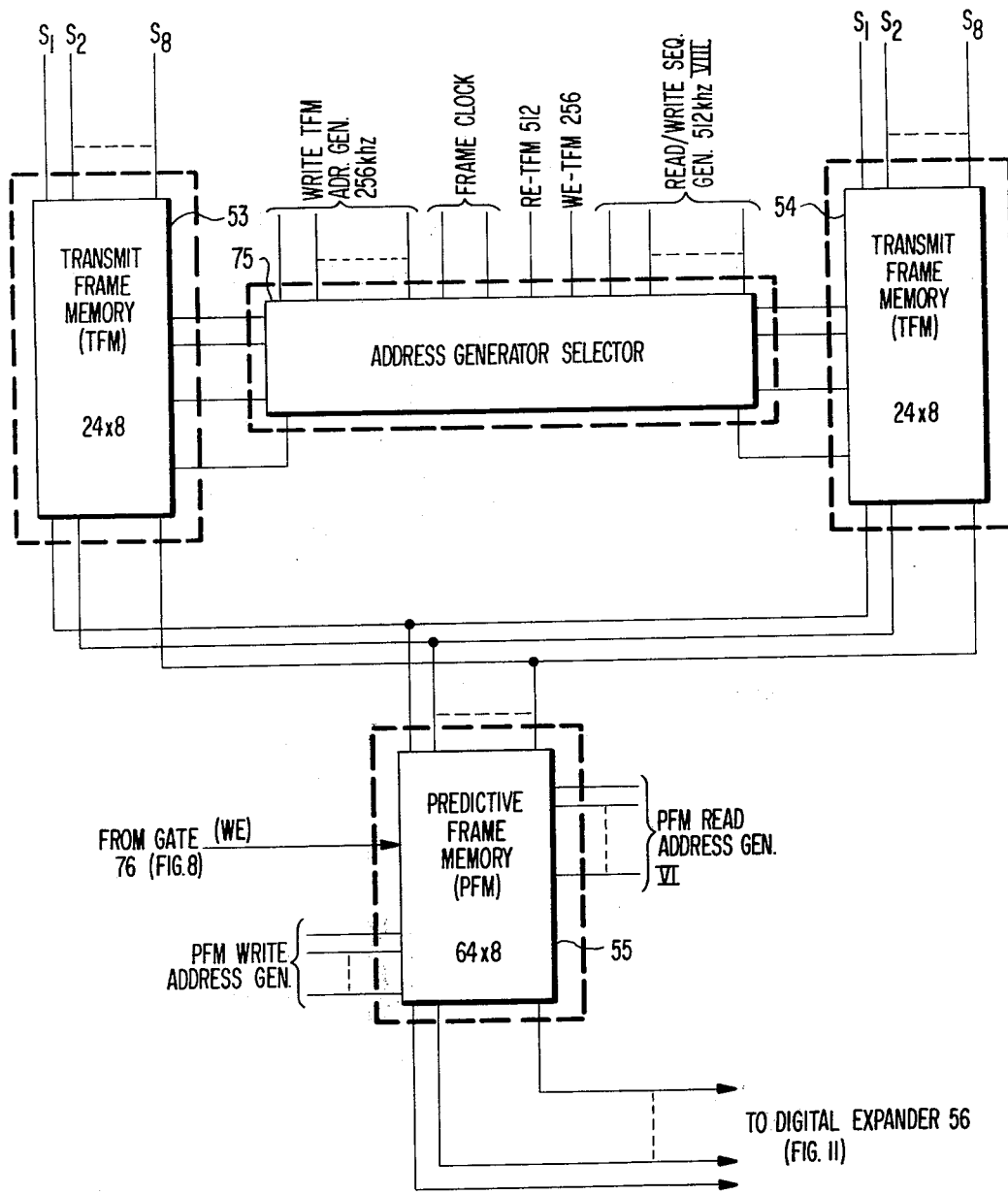
FIG. 9 is a schematic diagram of the processing unit of the receiver for processing the received digital signals.

Referring to FIG. 7, there is disclosed a schematic diagram of an input unit at the receiver which receives the frame of information transmitted. The received information comprising, in series, 64 bits of the SAW and 24 time slots $T_1$-$T_{24}$ of voice information is received on input line 46. The SAW is fed to parity check apparatus 47 and to the SAW memories 51 and 52 (FIG. 8). As with the SAW memories 13 and 14 at the transmitter, the SAW memory units 51 and 52 operate during alternate frame periods to write and read the SAW. During one frame, for example while memory 51 is accepting the received SAW, memory 52 is outputting the previously received SAW. The operation of these memory units is controlled by the 8 khz frame clock and the 2048 khz write enable (WE-SAW) pulses from the memory control unit (FIG. 10). After the received SAW is stored in one of the memories, for example memory 51, the channels of information $T_1$-$T_{24}$ are received and transferred to the two four-bit shift registers 48 and 49. Each received sample comprising eight bits is then shifted into one of two transmission frame memories (TFM) 53 or 54 (FIG. 9). As with the transmit frame memories (TFM) 16 and 17 at the transmitter, the transmission frame memories 53 and 54 operate during alternate frame periods to write and read the received code words in time slots $T_1$-$T_{24}$. Again during one frame period while, for example, TFM 53 is writing-in the received samples, the previously received samples are being read from memory 54.

Assuming the presently received frame of information is stored in the respective SAW memory unit 52 and TFM 54 and a parity check (described later) has indicated that the received SAW was not corrupted by an odd number of errors, the manner in which the 64 voice circuits at the receiver are updated will now be described. In doing so, it should be noted that though there is an effective recirculation of the servicing sequence of the voice circuits at the transmitter, the voice circuits $C_1$-$C_{64}$ are always initially sampled in a set sequence starting with voice circuit $C_1$ and sequencing through voice circuit $C_{64}$. Accordingly, the demultiplexer at the receiver must also demultiplex the updated frame of information of the 64 voice circuits starting with voice circuit $C_1$ and sequencing through voice circuit $C_{64}$. It is, therefore, necessary that predictive frame memory (PFM) 55 deliver the frame of information to the digital expander 56 and eventually to the digital-to-analog converter 57 in a set sequence starting with voice circuit $C_1$ and sequencing through voice circuit $C_{64}$.

The TFM 54, which is a memory having 24 rows of 8-bits/row, receives and stores the transmitted samples $T_1$-$T_{24}$ in an order wherein the lowest active voice circuit relative to the particular sequence is stored. That is, continuing with the present example, sequence number 3 of the possible 64 sequences is transmitted. The transmitter has effectively selected for possible transmission voice circuit $C_3$ as the first voice circuit. If the first five bits of the SAW are 00101 (corresponding to $C_3$, $C_4$, $C_5$, $C_6$, $C_7$, . . .), as previously mentioned, then the sample corresponding to voice circuit $C_5$ is the first unpredictable sample and will be located in time slot $T_1$ and, when received, will be stored in the first row of TFM 54. Accordingly, voice circuit $C_5$ will be the lowest active circuit relative to the sequence number 3. Thereafter, voice circuit $C_1$ may be the 22nd active circuit relative to the sequence number 3 and would be eventually stored in row 22 of TFM 54. It would then be necessary to transfer the unpredictable samples in TFM 54 to PFM 55 starting with the unpredictable sample corresponding to voice circuit $C_1$, placing that sample in the first row of PFM 55 followed in sequence by the active voice circuits in sequence number 3 subsequent to voice circuit $C_1$.

To be able to transfer the samples from TFM 54 to PFM 55 in a manner for proper reconstruction of the 64 voice circuits, it is necessary to know for any sequence number 1–64 where (in the particular sequence under consideration) in the SAW the bit associated with voice circuit $C_1$ is located. If the transmitter is presently operating under sequence number 3 and the receiver knew that the particular sequence being received is sequence number 3, then it knows that the first bit received in the SAW corresponds to circuit $C_3$. The receiver can then determine that the 63rd bit in the received SAW will correspond to the voice circuit $C_1$. If the received sequence was number 21, then the 45th bit in the received SAW would correspond to voice circuit $C_1$, and so on. Accordingly, in response to a clock synchronized with the reception of the first bit of the SAW, the two fourbit counters 58 and 59 (the sequence generator of the receiver synchronized with the sequence generator of the transmitter) in the memory control unit of FIG. 10 emit a 6-bit code word representing the sequence number 3. The six-bit code word representing sequence 3 is then fed to two four-bit counters 60 and 61. These four-bit counters 60 and 61 commence counting from the number 3 at the SAW clock rate of 2048 khz at a time when the first bit of the SAW is being received over line 62. The output of four-bit counters 60 and 61 is then correlated in correlators 63 and 64 which are set to the number 63. When the four-bit counters 60 and 61 reach the count of 63, there is a correlation and the receiver then knows that in the next clock period the received SAW bit will be that corresponding to voice circuit $C_1$. When the count of 63 is reached, a pulse is fed via line 65 to flip-flop 66. Flip-flop 66 then changes state inhibiting a gate 67 which has been previously enabled to pass all the bits of the received SAW starting with the first bit relating to voice circuit $C_3$ up to and including the bit relating to voice circuit $C_{64}$. While the gate 67 is passing the received sequence of SAW bits, the number of "1's" being received are counted in four-bit counters 68 and 69 which are equivalent to a 6-bit counter. When the gate 67 is disabled, the four-bit counters 68 and 69 have reached a count which indicates (assuming the count is 21) that the first 21 rows in the TFM 54 store unpredictable samples corresponding to 21 of the voice circuits from $C_3$ . . . $C_{64}$. This number 21 is then shifted into four-bit counters 70 and 71. While the foregoing is occurring, the sequence generator (counters 58 and 59) has transferred a 6-bit code word to multiplexer 73. As a result, the bit relating to $C_1$ will be the first bit read from either SAW memory 51 or 52 followed in sequence by the remaining 63 bits of the SAW. When the 4-bit counters 70, 71 have stored therein the number (21) of active voice circuits from $C_3$-$C_{64}$, the SAW memory 52 is enabled to emit the bit relating to voice circuit $C_1$. If this bit is, for example, a "1", then it is fed via gate 74 to the counters 70, 71 where it advances the count one number to 22. This number 22, which is fed to TFM 54 via the address generator selector 75 (similar to address generator select 21 at the transmitter), then defines row 22 in TFM 54 as the row containing the unpredictable sample corresponding to voice circuit $C_1$. The "1" from memory 52 is also fed via multiplexer 73 to predictive frame memory (PFM) 55 via gate 76 to serve as a write enable (WE) pulse. At the time the write enable (WE) pulse is received, the PFM 55 has also received a code word from the PFM read-write address generator (see FIG. 10) which defines the first row of memory 55 which always stores the sample from voice circuit $C_1$. Accordingly, in response to the write enable pulse, the 22nd row of TFM 54 containing an unpredictable sample from voice circuit $C_1$ is transferred from the TFM 54 to the first row of PFM 55. Thereafter, as the SAW memory 52 emits the SAW via gates 74 and 76, each time there is a "1" the counters 70 and 71 are advanced one number thereby advancing the TFM 54 to the row associated with that "1". Each time a bit ("0" or "1") is emitted from SAW memory 52 and multiplexer 73, the PFM read-write address generator advances one number thereby defining the next row in PFM 55. Consequently, each time a "1" is emitted from SAW memory 52, the unpredictable sample in TFM 54 is properly transferred to the PFM 55 in a manner heretofore discussed wherein the unpredictable sample replaces the corresponding previous sample stored therein. In this manner, the sampling sequence is "desequenced".

After the frame is analyzed and all the unpredictable samples are transferred to the PFM 55, the samples from voice circuit $C_1$-$C_{64}$ are sequenced out of PFM 55 and fed to digital expander 56. Digital expander 56, well known in the art, expands each eight-bit sample to a 12-bit sample and transfers the sample to a digital-to-analog converter 57 wherein each sample is converted to analog form. Thereafter, the analog samples are demultiplexed and fed to the proper receive circuits $C_1$-$C_{64}$.

When the number of voice samples written into the TFM 54 is less than the capacity of TFM 54, it is not necessary to transfer voice samples from the TFM 54 to the PFM 55 when the TFM read generator (counters 70, 71) has reached a number corresponding to the maximum number of samples stored therein. For example, if there were only 20 unpredictable samples in the transmitted frame, then only the first 20 rows of TFM 54 will be filled with unpredictable samples. Accordingly, in de-sequencing the samples from TFM 54 to PFM 55, when the 20th row has been reached it would not be necessary to examine the remainder of the SAW for possible unpredictable samples. Upon reaching the highest numbered sample stored relative to the particular sequence, the de-sequencing operation may cease since no more samples need be de-sequenced. The receiver does this by storing in register 77, which relates to TFM 54 (register 78 relates to TFM 53), the code word corresponding to the specific TFM write address defining the row in TFM 54 where the last sample to be transferred into TFM 54 is stored. This number is then fed to correlator 79 where it is correlated with the 5-bit code word from the two four-bit counters 70 and 71. When this latter number correlates with the code word from register 77, the receiver will know that the highest number sample relative to the sequence has been reached. In response thereto, the correlator 79 will emit a reset pulse which will cause the 4-bit counters 70, 71 to reset.

The actual 6-bit sequence code word (plus 2 parity bits) defining the particular servicing sequence is transmitted in the unused channels on a more-or-less periodic basis. The purpose of this is to verify to the receiver the particular sequence being transmitted in the event that the sequence generator of the receiver might not be in synchronization with the sequence generator of the transmitter. Therefore, the SAW, as it is received over line 46, is fed to a five-bit counter 80 of FIG. 7 via gate 81 wherein five-bit counter 80 counts the number of "1's" in the SAW. If the number in counter 80 is less than 24 when correlated in correlator 84, then a condition is indicated wherein the sequence code word has been transmitted. In response to this condition, the sequence code word which has been transmitted in several of the available time slots is first checked for parity and then fed to register 85 and then transferred to register 86 during the next clock period. During that next clock period, the contents of the next time slot, which should be the same as the contents of register 86, is transferred to register 87. Then correlator 88 correlates these two code words, and if they are the same, it is an indication that the sequence code word was transmitted without error. In response thereto, flip-flop 89 changes state enabling gate 90 which causes the transmitted sequence code word to be jammed into counters 91 and 92 of the sequence generator for use as the receiver generated sequence code word. In this manner, the receiver is insured that it is de-sequencing the particular frame under the right sequence.

A parity check is made at the input unit of the receiver to determine if an even number of "1" bits in the SAW is being received. If the parity check indicates there is an even number of "1's", then the receiver is allowed to process the received unpredictable samples associated with that SAW to enable reconstruction of the voice samples in the frame. However, if the parity check indicates that an odd number of "1's" in the SAW has been received (due, for example, to the corruption of one of the bits in the SAW by channel noise), then the receiver is not allowed to process the unpredictable samples since the channel routing information provided by the SAW in incorrect. Instead, the receiver reconstructs the samples already stored in PFM 55 without updating those samples with the received unpredictable samples. This will result in an amplitude error; however, this error will be slight since the samples which should have been updated will be close in value to their corresponding unpredictable samples.

To make a parity check, as the SAW is being received, each time a "1" appears, gate 93 is enabled via an enabling level from 4-bit counters 94, 95 and gate 96. Each time gate 93 is enabled, the flip-flop 97 changes state. If, after the entire SAW is received, flip-flop 97 is in the state indicating a parity check, then an enabling level via gate 98 is fed to one of two flip-flops 99, 100 (there being one flip-flop associated with TFM 53 and one associated with TFM 54) which outputs an enabling level to gate 76 thereby enabling the substitution of unpredictable samples in PFM 55. If a parity check is not indicated, then gate 76 does not receive an enabling level and the unpredictable samples transmitted with the SAW are not processed.

As described herein, the present invention employs recirculation of the service priorities each frame in order to optimize the adaptable predictor. This feature of the invention is accomplished by sequencing the sample assignment priorities at the transmitter and "de-sequencing" the sample assignment at the receiver. The transmitter updates the starting circuit number in the sequence by one count every frame. The receiver makes use of this fact by also updating its starting circuit number by one count every frame.

An alternate method of accomplishing the recirculation feature of the present invention is to perform both the "sequencing" and "de-sequencing" operations at the transmitter. That is, the service priorities are sequenced as previously described. However, before the output frame is transmitted, both the sample assignment word and the transmitted samples ($T_1$ through $T_{24}$) are "de-sequenced" so that the receiver always receives the SAW in the correct order (i.e., 1, 2, ..., 64) and the sample $T_1$ always corresponds to the lowest order active circuit relative to circuit $C_1$.

With the de-sequencing at the transmitter, there would be significant simplifications in the memory control units in both the transmitter and receiver. The reason for this is that since there are less operations occurring simultaneously but rather over several frame periods (the transmission frame comprises unpredictable samples two frame periods removed from the present servicing frame), duplicate memory controls at the transmitter and at the receiver are not necessary to perform the simultaneous operations.

It should also be noted that though the receiver will automatically know where in the SAW the bit relating to circuit $C_1$ appears, the parity bit will occupy any one of 64 positions in the saw over a 64 frame period. The receiver though would be able to locate the position of the parity bit in the SAW as it was able to locate the position of the bit relating to circuit $C_1$ when de-sequencing occurred at the receiver. In this manner, a parity check may be made to determine if the correct SAW has been received.

It will be apparent that the embodiment shown is only exemplary and that various modification can be made in construction and arrangement within the scope of the invention as defined in the appended claims.

What is claimed is:

1. In a digital communications system wherein information from a designed maximum plurality of voice circuits at a transmitting station may be transmitted to a receiving station via a transmission path of given power level, bit rate and bandwidth, apparatus for enabling the transmission of information from a number greater than said designed maximum plurality of voice circuits over said transmission path comprising:
   a. means at said transmitting station for periodically sampling the amplitude of voice signals on each circuit of said plurality of voice circuits;
   b. means for comparing for each said circuits, a present amplitude sample with a prior amplitude sample which has been transmitted to said receiving station, said comparing means generating difference signals in response to said comparisons;
   c. means for comparing said difference signals with a plurality of aperture threshold values and generating an activity map for each aperture threshold value;
   d. means for selecting the smallest aperture value which results in an activity map corresponding to activity in not exceeding a fixed predetermined number of circuits; and
   e. means for generating a transmission frame comprising a digital representation of those present amplitude samples conforming to the activity map of the selected aperture value and a digital word representing said activity map.

2. The apparatus of claim 1 wherein the servicing sequence of said sampling means is changed such that, periodically, a different voice circuit is the first circuit sampled.

3. In a digital communications system wherein information from a plurality of voice circuits at a transmitting station may be transmitted at a designed minimum bit rate to a receiving station via a transmission path, apparatus to enable the transmission of information from said plurality of voice circuits over a transmission path at less than said designed minimum bit rate comprising:
   a. means for sampling and digitally encoding, at least once each of successive sampling frames, the amplitude of the analog signal in each voice circuit;
   b. means for digitally comparing the encoded amplitude samples of a present sampling frame with corresponding encoded amplitude samples of a prior sampling frame and for generating for each frame a difference signal identifying each comparison;
   c. means for comparing each difference signal with a plurality of aperture threshold signals and generating a digital representation of circuit activity for each of said aperture threshold signals;
   d. means for selecting the smallest aperture threshold signal wherein the corresponding digital representation of circuit activity represents activity in less than a fixed predetermined number of circuits; and
   e. means for generating a frame of information for transmission to said receiving station comprising first digital signals representing the amplitude of those present samples which differ from the corresponding prior samples by the selected aperture threshold signal and second said corresponding digital representation of circuit activity.

4. The apparatus of claim 3, further including means for periodically changing the order by which all circuits are serviced during successive transmission frames.

5. The apparatus of claim 4, further comprising means for generating, as part of the transmission frame, a digital code word representing the particular voice circuit servicing sequence.

6. In a digital communications system wherein information from a plurality of voice circuits at a transmitting station may be transmitted to a receiving station via a transmission path, wherein each of the voice circuits is sampled at the Nyquist sampling rate at least once during each of successive sampling frame periods, wherein each of the resultant samples are encoded into digital signals and wherein the transmitter requires a minimum bit rate to transmit all of said digital signals for a given voice transmission quality, apparatus to enable the digital transmission at said given voice quality of either said information from said plurality of voice circuits over a transmission path at less than said minimum bit rate, or information from more than said plurality of voice circuits at said minimum bit rate comprising:
   a. a first storage means at the transmitting station for storing, for each voice circuit, said digitally encoded samples from a prior sampling frame;
   b. means, connected to said first storage means, for digitally comparing the sample from each respective voice circuit for a present sampling frame with the sample stored in the first storage means for such respective voice circuit and for providing a difference signal for each comparison representing the particular voice circuit whose sample is being compared;
   c. means for comparing each difference signal with a plurality of aperture threshold signals and generating a digital representation of circuit activity for each of said aperture threshold signals;
   d. means for selecting the smallest aperture threshold signal wherein the corresponding digital representation of circuit activity represents activity in less than a fixed predetermined number of circuits;
   e. means for assembling and transmitting a digitally encoded transmission frame of information comprising said digital signals representing those present samples which differ from the selected aperture threshold signal and the digital representation of circuit activity corresponding to the selected aperture threshold;
   f. means at the receiver for receiving said digitally encoded transmission frame;
   g. a second storage means for storing for each voice circuit previously transmitted, digitally encoded samples from a prior sampling frame; and
   h. means connected to said receiving means for substituting for the samples stored in the second storage means, respective transmitted present samples in accordance with said identifying signals.

7. The apparatus of claim 6, further including apparatus, at a receiver, for reconstructing the samples in the present frame, comprising means for converting into analog form, for each transmission frame, the samples stored in said second storage means including the samples that were substituted into the storage means for said frame.

8. The apparatus of claim 6, further comprising:
a. sequence generating means, at the transmitter and the receiver, for respectively generating a digital code word identifying the sequence in which each of the voice circuits are to be serviced;
b. means for transmitting the sequence identifying code word generated at the transmitter as part of the transmission frame; and
c. means for utilizing the received sequence identifying code word in place of the sequence identifying code word generated at the receiver when reception of the proper sequence identifying code word is indicated.

9. The apparatus of claim 6, including means for varying the order in which the plurality of voice circuits are sampled for each of successive transmission frames comprising:
a. third storage means for digitally storing the identifying signal for each comparison in a present frame;
b. fourth storage means for digitally storing all of the samples of a present frame;
c. fifth storage means for digitally storing those present samples which are to be transmitted;
d. sequence generating means for generating a digital code word identifying the order in which each of the voice circuits is to be serviced;
e. means, responsive to the digital code word identifying the servicing order, for enabling the third and fourth storage means, respectively, to read-out the contents of the third storage means commencing with the signal corresponding to the voice circuit which is to be serviced first and to read-out the counters of the fourth storage means commencing with the sample corresponding to that voice circuit which is to be serviced first; and
f. means for transferring, from the fourth storage means to the fifth storage means, in accordance with the signals read out from the third storage means, those present samples which are to be transmitted.

10. The apparatus of claim 9, wherein said means for substituting comprises:
a. sixth storage means for digitally storing the transmitted samples;
b. means for determining where in the received identifying signals the identifying signal relating to the first samples voice circuit is located;
c. means for identifying the location in the sixth storage means of the sample from the lowest active channel relative to the first sampled voice circuit; and
d. means for transferring the samples stored in the sixth storage means to the second storage means commencing with the sample from the lowest active channel.

* * * * *

UNITED STATES PATENT AND TRADEMARK OFFICE
CERTIFICATE OF CORRECTION

PATENT NO. : 4,066,844
DATED : January 3, 1978
INVENTOR(S) : Robert Paul Ridings, Jr. et al It is certified that error appears in the above-identified patent and that said Letters Patent are hereby corrected as shown below:

Column 4, line 35 - after "samples" delete "than" insert -- that --

Column 5, line 63 - delete "ransmitted" insert -- transmitted --

Column 6, line 62 - delete "adressing" insert -- addressing --

Column 8, line 49 - delete "alue" insert -- value --

Column 11, line 60 - delete "orresponding" insert -- corresponding --

Column 12, line 15 - after "output" insert -- to output --

Column 13, line 61 - delete "fourbit" insert -- four-bit --

Column 16, line 9 - delete "in" insert -- is -- line 64 - delete "saw" insert -- SAW --

Signed and Sealed this

Twenty-fourth Day of October 1978

[SEAL]

Attest:

RUTH C. MASON
*Attesting Officer*

DONALD W. BANNER
*Commissioner of Patents and Trademarks*